Feb. 1, 1966 R. S. BRENNON 3,233,232

DELAYED ALARM SYSTEM WITH CODED LOCATION SIGNAL OPERABLE TO ALARM DESPITE FAULTS IN SIGNAL TRANSMISSION TO REMOTE STATION

Filed Dec. 17, 1962 5 Sheets-Sheet 1

INVENTOR

RALPH S. BRENNON

Imirie & Smiley
Attys.

INVENTOR
RALPH S. BRENNON
Imirie & Smiley
Attys.

Feb. 1, 1966 R. S. BRENNON 3,233,232

DELAYED ALARM SYSTEM WITH CODED LOCATION SIGNAL OPERABLE TO ALARM DESPITE FAULTS IN SIGNAL TRANSMISSION TO REMOTE STATION

Filed Dec. 17, 1962 5 Sheets-Sheet 3

INVENTOR

RALPH S. BRENNON

Imirie & Smiley

Attys.

INVENTOR

RALPH S. BRENNON

Imirie & Smiley
Attys.

DELAYED ALARM SYSTEM WITH CODED LOCATION SIGNAL OPERABLE TO ALARM DESPITE FAULTS IN SIGNAL TRANSMISSION TO REMOTE STATION

Filed Dec. 17, 1962 5 Sheets-Sheet 5

INVENTOR
RALPH S. BRENNON
Irmin & Smiley
Attys.

United States Patent Office 3,233,232

Patented Feb. 1, 1966

3,233,232

DELAYED ALARM SYSTEM WITH CODED LOCATION SIGNAL OPERABLE TO ALARM DESPITE FAULTS IN SIGNAL TRANSMISSION TO REMOTE STATION

Ralph Samuel Brennon, 19 Gorse Road, Robertsham, Johannesburg, Transvaal, Republic of South Africa Filed Dec. 17, 1962, Ser. No. 245,018
Claims priority, application Republic of South Africa, Dec. 21, 1961, R 2,977/61
6 Claims. (Cl. 340—226)

This invention relates to alarm systems, such as burglar and/or fire alarm systems.

Numerous systems of burglar and/or fire alarms are known and work is continually being done to increase the effectiveness and reliability of alarm systems. It is accordingly an object of the present invention to provide an improved alarm system which is highly effective and reliable.

According to one aspect of the invention a signalling method for protecting a plurality of individual spaced zones, includes the steps of detecting an alarm condition occurring in any one of the zones; automatically setting a local alarm located at the alarm condition zone to operate; automatically establishing a communication link between the alarm condition zone and a remote station common to all the zones, through an automatic telephone system; automatically transmitting an alarm signal in the form of an identification code distinctive of the alarm condition zone from that zone to the remote station through the communication link; automatically analysing a signal received at the remote station; automatically transmitting from the remote station to the alarm condition zone concerned through the communication link and acknowledgement signal upon error-free receipt at the remote station of the accredited identification code of that zone; and automatically immobilising the local alarm upon receipt at the alarm condition zone of the acknowledging signal from the remote station.

According to another aspect of the invention an alarm system includes alarm condition detector means at a protected zone; delayed action local alarm means located at the protected zone and adapted to be set upon detection of an alarm condition to operate after a predetermined interval of time; signalling means at the local station responsive to the detection of an alarm condition, the signalling means being adapted to establish a communication link with a remote station through an automatic telephone system and to send to the remote station through the communication link an identification signal code distinctive of the protected zone; signal receiving means at the remote station; signal analysing means at the remote station; acknowledgement signal transmitting means located at the remote station and adapted to send an acknowledging signal back to the protected zone through the communication link upon error free receipt at the remote station of the accredited identification signal code of the protected zone; and control means at the protected zone adapted to immobilize the local alarm means upon receipt of an acknowledging signal from the remote station in response to an alarm signal from the protected zone.

A preferred embodiment of the invention will now be described by way of example with reference to the accompanying drawings in which.

Figure 1:
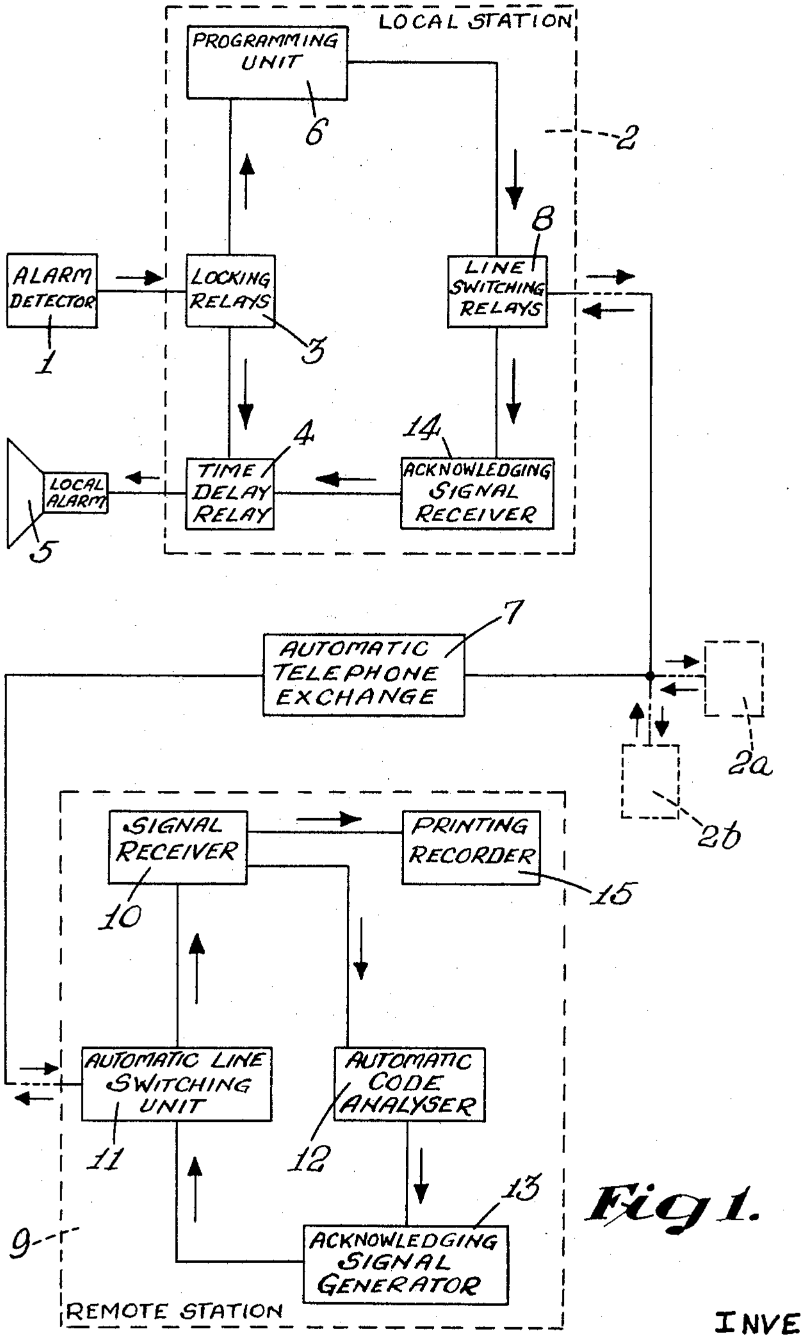
FIGURE 1 is a diagrammatic representation of a basic alarm system according to the invention.

Referring to FIGURE 1, a suitable detector 1 is located on premises required to be protected. Upon detection of an alarm condition, detector 1 causes operation at local station 2 on the protected premises, of locking relays 3 which, in turn, causes actuation of time delay relays 4 automatically to cause operation of local alarm 5 located on the protected premises, after the lapse of a predetermined time interval.

Locking relays 3 also actuate programming unit 6 so as automatically to engage a telephone line to telephone exchange 7 via line switching relays 8, and automatically to dial the number of remote station 9. After establishing communication between local station 2 and remote station 9, programming unit 6 automatically transmits an alarm signal in code to remote station 9 via exchange 7.

At remote station 9, the coded alarm signal is received by receiver 10 via line switching unit 11, and is analysed automatically in unit 12. If the coded signal is received correctly, oscillator 13 is caused automatically to transmit an acknowledging signal back to local station 2 via line switching unit 11, exchange 7 and line switching relays 8 to acknowledging signal receiver 14. Upon receipt of the acknowledging signal at local station 2, operation of local alarm 5 is prevented automatically if the predetermined time interval has not yet lapsed. If an acknowledging signal is not received by the end of the predetermined period, local alarm 5 operates automatically.

For record purposes, a printed representation of each signal received by receiver 10 at remote station 9, is recorded automatically by printing recorder 15.

Figure 4:
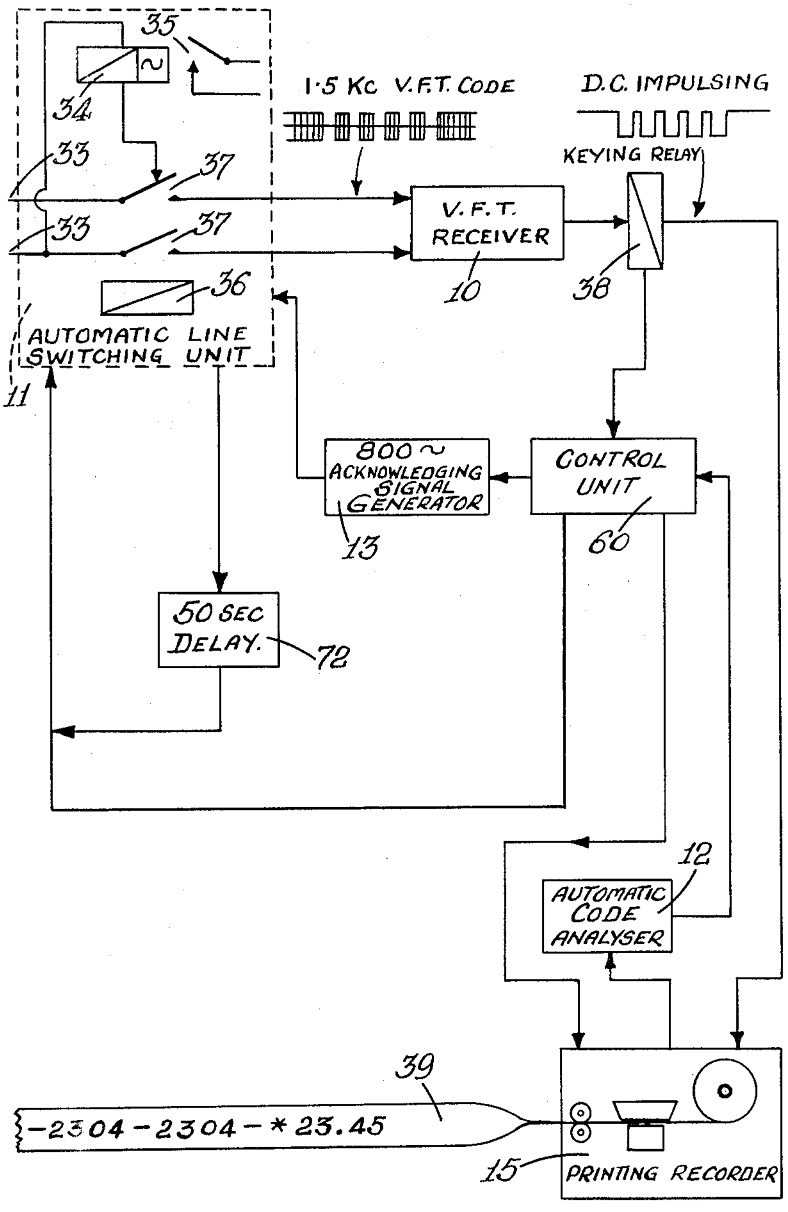
FIGURE 4 is a diagrammatic representation in greater detail of a remote station of the basic system of FIGURE 1.

For the sake of clarity, printing recorder 15 is shown independently of code analyser 12 in FIGURE 1. It is, however, preferably from the point of view of safety for code analyser 12 to operate through recorder 15. This arrangement is illustrated in FIGURE 4.

With the above arrangement as applied to burglar alarms, a silent alarm signal is transmitted from local station 2 to remote station 9. Upon receipt of an alarm signal at remote station 9 the necessary action can be taken to alert the police. In view of the silent nature of the alarm signal, an unauthorised person intruding on the protected premises will be unaware of the alarm so that the chances of his apprehension are excellent.

As a safety feature, local alarm 5 is actuated if local station 2 does not receive an acknowledgement from remote station 9 that the alarm signal has in fact been received. Local alarm 5 may be a bell or a siren designed to attract the attention of members of the public and the police force and also to scare off the intruder.

The system is therefore designed to fail to safety.

It is well known that signalling systems recognise two basic types of signalling, namely positive signalling on the one hand and negative signalling on the other hand. Positive signalling may be defined as:

A signalling regime whereby the alarm condition is transmitted to a distant point as and when required on the presupposition that the communicative path is intact; and negative signalling may be defined as:

A signalling regime which generally satisfies "fail to safety" considerations, and is based on withholding a signal or transmitting a pre-arranged signal at specific times such that signal failure is interpreted as an alarm condition. (Here the alarm condition is established by "inference.")

In effect, the alarm system of FIGURE 1 incorporates positive and negative signalling regimes. A positive signalling link is established between local station 2 and remote station 9 via the facilities of the automatic telephone system to transmit the identification code. In addition, a negative signalling loop extends from local station 2 to remote station 9 and back to local station 2 for discreet control of local alarm 5. The negative signalling loop can be arranged to embrace the whole of the communication system i.e. the signalling circuits of local station 2, the telephone lines, automatic telephone exchange 7 and remote station 9.

Normally, remote station 9 would be common to a plurality of individual, spaced local stations such as 2, 2a, 2b. In FIGURE 1, the various local stations are shown connected to remote station 9 through a single telephone exchange 7. It will be appreciated that in practice the various local stations might be connected to a common remote station through a network of interconnected telephone exchanges.

Where a plurality of local stations are associated with a common remote station, each local station will have its own distinctive identification code to avoid confusion at the remote station.

Figure 2:
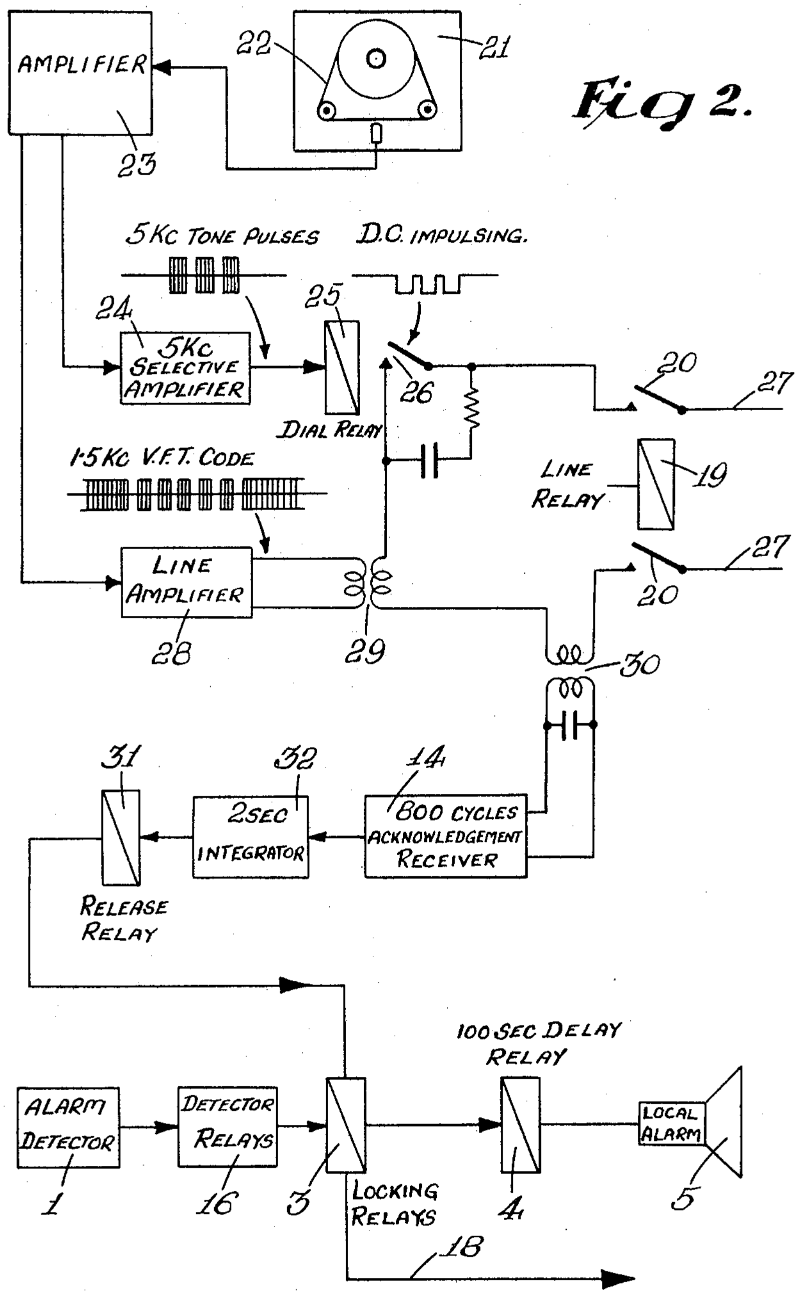
FIGURE 2 is a diagrammatic representation in greater detail of a local station of the basic system of FIGURE 1.

Referring now to FIGURE 2, alarm detector 1 and detector relays 16 may be of conventional design and arrangement such as are commonly used with burglar alarms. Upon detection of an alarm condition, detector relays 16 cause locking relays 3 to operate, thereby to prime time delay relay 4 to cause operation of local alarm 5 after a time interval of say 100 seconds. Locking relays 3 also prime via line 18 all the signalling circuits in local station 2, including energisation of line relay coil 19 to close line contacts 20 and energisation of the operating motor (not shown) of magnetic tape unit 21.

Telephone dialling and identification code programming is achieved by means of pre-recorded, continuous magnetic tape 22 of unit 21 which bears make-break information recorded as keyed high frequency tones, such as 5000 cycles per second for dialling and 1500 cycles per second for the identification code. When unit 21 is put into operation, the recorded programme is recovered and amplified by amplifier 23. The output of amplifier 23 is filtered by selective amplifier 24 and 5 kc. tone pulses are fed to dialing relay coil 25 which is responsive to such pulses.

Dialling relay coil 25 actuates contact set 26, thereby producing suitable D.C. dialling impulses in telephone lines 27 to cause dialling of the number of remote station 9 through telephone exchange 7 on a D.C. make-break regime corresponding to prescribed automatic telephone practice.

The identification code is transmitted on a keyed tone regime embracing the basic principles of what is known in the art as "Voice Frequency Telegraphy" (abbreviated as V.F.T.). The code may comply with any desired form depending on the presentation method employed at remote station 9. In the preferred form of the invention, the identification code is of the same form as the digital make-break code employed for telephone dialling.

Accordingly, the make-break regime constituting the identification code is arranged to modulate a voice frequency tone for transmission to remote station 9 as a V.F.T. signal. The voice frequency may be modulated on a make-break basis as employed in standard V.F.T. technique, or as frequency shift modulation or any desired modulation regime.

As shown in FIGURE 2, the identification code is fed as a 1.5 kc. V.F.T. code from line amplifier 28 into telephone lines 27 through transformer 29. During the V.F.T. signalling sequence relay coil 25 remains energised to keep contact set 26 closed during transmission of the identification code. Apart from contact set 26, relay coil 25 is associated with a second contact set (not shown) which holds locking relays 3 during transmission of the V.F.T. identification code.

Figure 3:
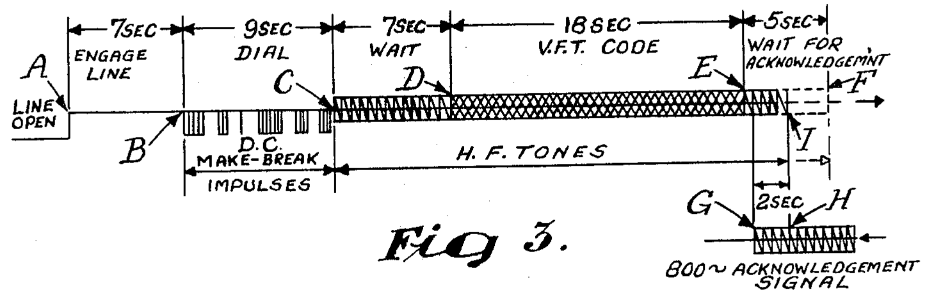
FIGURE 3 shows diagrammatically the dialling, alarm signalling and acknowledgement signalling sequences employed.

The programmed signalling cycle will be understood clearly by referring to FIGURE 3. As shown, line contacts 20 are closed to engage telephone lines 27, at point A. After an interval of 7 seconds, the D.C. dialing impulses commences at point B and continues for a period of 9 seconds up to point C. Thereafter, the identification signalling sequence commences and includes a waiting period of 7 seconds up to point D during which an unmodulated 1.5 kc. tone is provided, to permit ringing of the number of remote station 9 and the establishment of a communication link between local station 2 and remote station 9 through telephone exchange 7. Between points D and E, the 1.5 kc. V.F.T. tone is modulated according to the identification code to transmit an alarm signal to remote station 9. The coded signal is transmitted during a period of 18 seconds up to point E. Thereafter an unmodulated 1.5 kc. tone is supplied. If no acknowledging signal is received from remote station 9, the 1.5 kc. tone will continue for a further period of 5 seconds up to point F and will then be terminated. Thereupon a short 5 kc. pulse causes relay 25 to operate and release contact set 26, thereby causing release of the telephone exchange selectors and disengaging the telephone line in preparation for a further dialling sequence. If, however, an acknowledging signal is received from remote station 9 during the period between points E and F as shown in FIGURE 3, such acknowledging signal will be passed from telephone lines 27 to acknowledging signal receiver 14 through transformer 30 as shown in FIGURE 2. The resulting output from receiver 14 energises release relay 31 to cause locking relays 3 to release. This returns all the circuits of local station 2 to a quiescent state, causes line contacts 20 to open and prevents local alarm 5 from operating. The 1.5 kc. tone will be terminated at a point such as I.

In order to prevent release of locking relays 3 by a spurious signal, 2-second integrator 32 is provided in circuit ahead of release relay 31. Unless the signal output from receiver 14 is maintained for a period of 2 seconds, integrator 32 does not allow release relay to be energised. In other words, the acknowledging signal must be maintained for a period of two seconds, such as between points G and H in FIGURE 3, in order to energise release relay 31.

Acknowledgment receiver 14 may include a selective reed relay arranged to operate only at the required frequency of 800 cycles per second. Integrator 32 may be of any suitable design and may include a condenser arrangement adapted to discharge into release relay 31 after a charging time of 2 seconds. Alternatively, an output from receiver 14 may be arranged to initiate rotation of an electric motor, rotation of the motor causing release relay 31 to be energised after an interval of 2 seconds.

Under normal conditions, remote station 9 should be connected to local station 2 by the dialling impulses of a single signalling cycle. To provide for cases where communication cannot be established immediately, magnetic tape 21 can be arranged to carry the make-break information of a single signalling cycle but to be repetitively rotatable say five times so that five signalling cycles may be provided one after the other. Alternatively, five complete signalling cycles may be recorded consecutively on tape 21.

If the dialling impulses of the first cycle cannot establish communication between local station 2 and remote station 9, each consecutive cycle will try to establish communication. As soon as communication is established and an identification code is received correctly at remote station 9, an acknowledging signal is transmitted back to local station 2.

The total time required for the completion of each signalling cycle is approximately 40 seconds whereas the delay for the operation of local alarm 5 is 100 seconds. If an acknowledging signal is received at local station 2 in response to the code signalling of the first or second cycle, operation of local alarm 5 is prevented. If no acknowledging signal is received at local station 2 after the second cycle, local alarm 5 operates automatically during the course of the third cycle, but dialling and signalling will continue. In the event of an acknowledging signal being received at local station 2 after subsequent cycle, operation of local alarm 5 will be terminated. If an acknowledging signal is not received at local station after the last signalling cycle, local alarm 5 will continue to operate until it is switched off manually. Apart from local alarm 5, the signalling apparatus of local station 2 is switched off automatically after the last signalling cycle.

Referring now to FIGURE 4 illustrating remote station 9 in greater detail, ringing current flowing in telephone lines 33 as a result of dialling from local station 2 during a signalling cycle, energises alternating current relay coil 34 to close contacts 35. This produces a pulse which energises all circuits in remote station 9, including relay coil 36 which closes line contacts 37 to complete the communication link between local station 2 and remote station 9.

A 1.5 kc. V.F.T. code transmitted from local station 2 is received by receiver 10. Polarised keying relay 38 is energised from receiver 10 and at this point the V.F.T. regime is converted back to a D.C. make-break impulsing regime for utilisation purposes.

The D.C. impulses are fed to a suitable printing recorder 15 arranged to respond to the make-break digital code to print the corresponding code characters. For example, this may be achieved by means of a suitable arrangement of relays and uniselector stepping switches (not shown) which are adapted to energise the print solenoids of an electric typewriter or similar printing device, thereby to print the code which is received on tape 39. For example, assume that the digit 4 is received. The four D.C. impulses cause a uniselector to step to its position 4 which is connected to the solenoid of the printing device corresponding to the digit 4. At the end of the impulse sequence during the interdigit pause, a momentary contact is established with a suitable relay which actuates the print solenoid to cause printing of digit 4. Following on this, the uniselector is arranged to auto-step to the "home" position and is then ready to respond to the next code digit.

Figure 5:
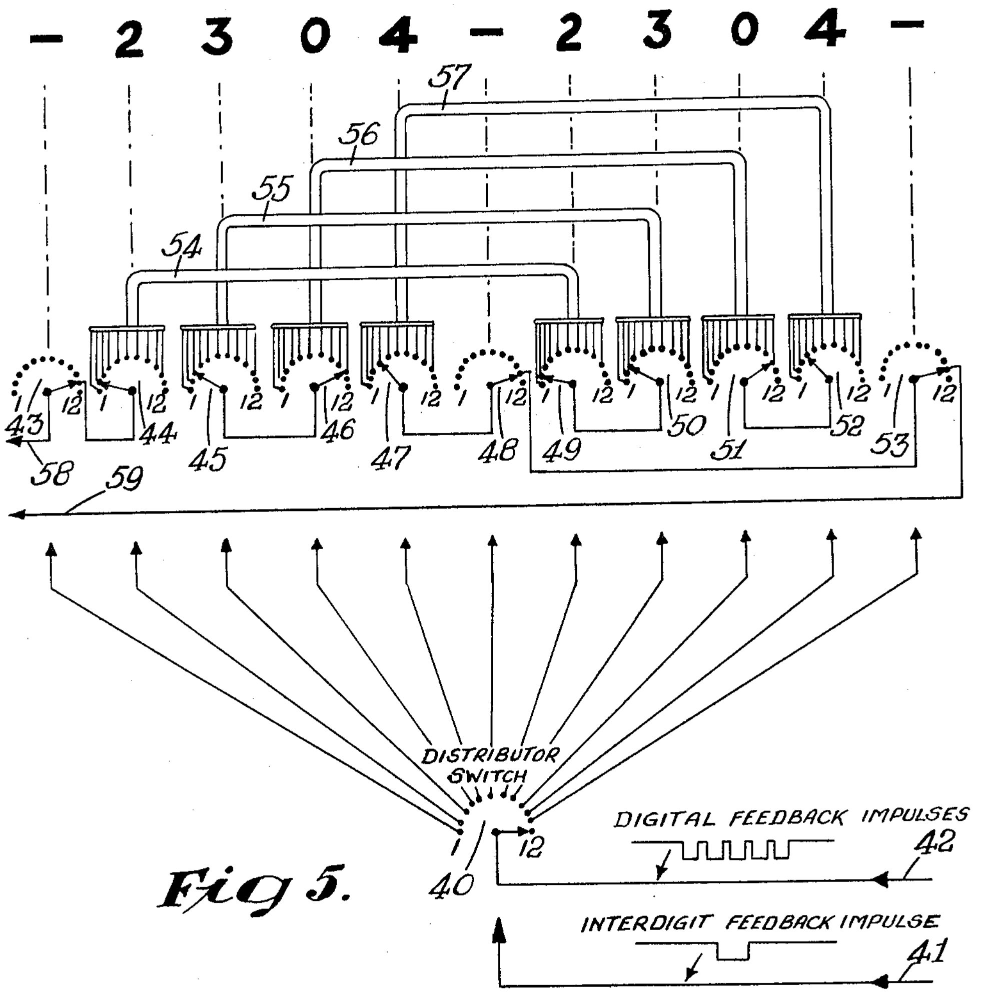
FIGURE 5 is a diagrammatic representation in greater detail of the code analyser unit of FIGURE 4.

Automatic code analyser 12 is connected to printing recorder 15 and is shown in greater detail in FIGURE 5.

It is necessary to establish automatically that a received signal is in fact an accredited identification code and not a spurious signal, and further that the received code is complete and devoid of transmission errors. It is accordingly preferred to transmit an alarm signal in the form of an identifying code comprising a repeated combination of a definite number of digits, and a control character preceding the first combination, interposed between the two combinations and following the second combination. The control character indicates the beginning and the end of a digit combination and may be transmitted as a make-break impulse regime comprising eleven breaks. This series of eleven breaks is arranged to be printed on tape 39 of printing recorder 15, as a hyphen or other suitable character to yield a printed identifying code such as –2304–2304–.

As shown in FIGURE 5, distributor switch 40 comprises a uniselector adapted to be stepped from position 1 to 12 by interdigit impulses derived by feedback from printing recorder 15 along line 41. Switch 40 will accordingly be stepped a single position at the end of each digital sequence.

Digital impulses corresponding to a signal received and derived by feedback from printing recorder 15 along line 42 are fed consecutively through distributor switch 40 to a storage arrangement comprising eleven uniselectors 43–53. Consecutive sets of digital impulses will pass through different positions of distributor switch 40 so that each set of digital impulses will cause stepping of its own uniselector in the bank of uniselectors 43 to 53.

For example, the eleven digital impulses of the first hyphen of the code will pass through position 1 of distributor switch 40 to step uniselector 43 to position eleven. The two digital impulses of the first digit 2 of the first combination of digits will pass through position 2 of distributor switch 40 to step uniselector 44 to position 2. FIGURE 5 shows the positions of distributor switch 40 and uniselectors 43–53 after receipt of the complete identifying code.

Positions 1 to 10 of uniselector 44 are individually connected to positions 1 to 10 respectively of uniselector 49 through cable 54. The positions of uniselectors 45, 46 and 47 are individually connected in similar manner to uniselectors 50, 51 and 52 respectively through cables 55, 56 and 57 respectively.

When the code is received correctly, a circuit will be completed from line 58 through uniselectors 43 and 44, cable 54, uniselectors 49 and 50, cable 55, uniselectors 45 and 46, cable 56, uniselectors 51 and 52, cable 57, uniselectors 47, 48 and 53 to line 59. Any departure from the correct code will fail to complete the circuit connection between lines 58 and 59.

The arrangement of FIGURE 5 automatically analizes a received signal code to establish whether the code is coherent and entirely free of transmission errors. To this end, the code must comprise a total of eleven characters made up of three hyphens and eight digits. Also, the sequential arrangement of hyphens and digits must be correct. In effect, the arrangement of FIGURE 5 counts the total number of characters, the number of hyphens, and the number of digits, and also examines the sequential relationship of hyphens and digits.

When an accredited and error free code is received, completion of the circuit connection between lines 58, 59 causes control unit 60 (FIGURE 4) to initiate the transmission of an acknowledging signal back to local station 2. An acknowledgement signal is withheld upon receipt of a signal at remote station 9 which fails to meet the stringent analysis requirements and cannot cause completion of the circuit connection between lines 58, 59.

Where remote station 9 is common to a plurality of individual local stations such as 2, **2*a* and 2*b*, the wipers of the bank of uniselectors 43–53** will be suitably interconnected in accordance with the different identifying code of the various local stations so that the single bank of uniselectors will then be able to analyse the identifying codes from any one of the local stations. It will be appreciated that the codes of all the different local stations should have the same structure. That is to say, the different codes should all have digit combinations with the same number of digits therein and the combinations should be repeated in the same manner. Also, the different codes should all include the same number of control characters in the same sequential relationship relative to the digit combinations.

The type of identification code described above is such that the chances of it being produced accidentally or falsely are remote.

Analyser 12 is operated through printing recorder 15 so that in the event of recorder 15 being faulty, the condition can be controlled by anaylser 12.

It will be appreciated that instead of code analyser 12 being operated through printing recorder 15, it may be operated in a manner similar to that described above by digital and interdigit impulses derived directly from keying relay 38.

Figure 6:
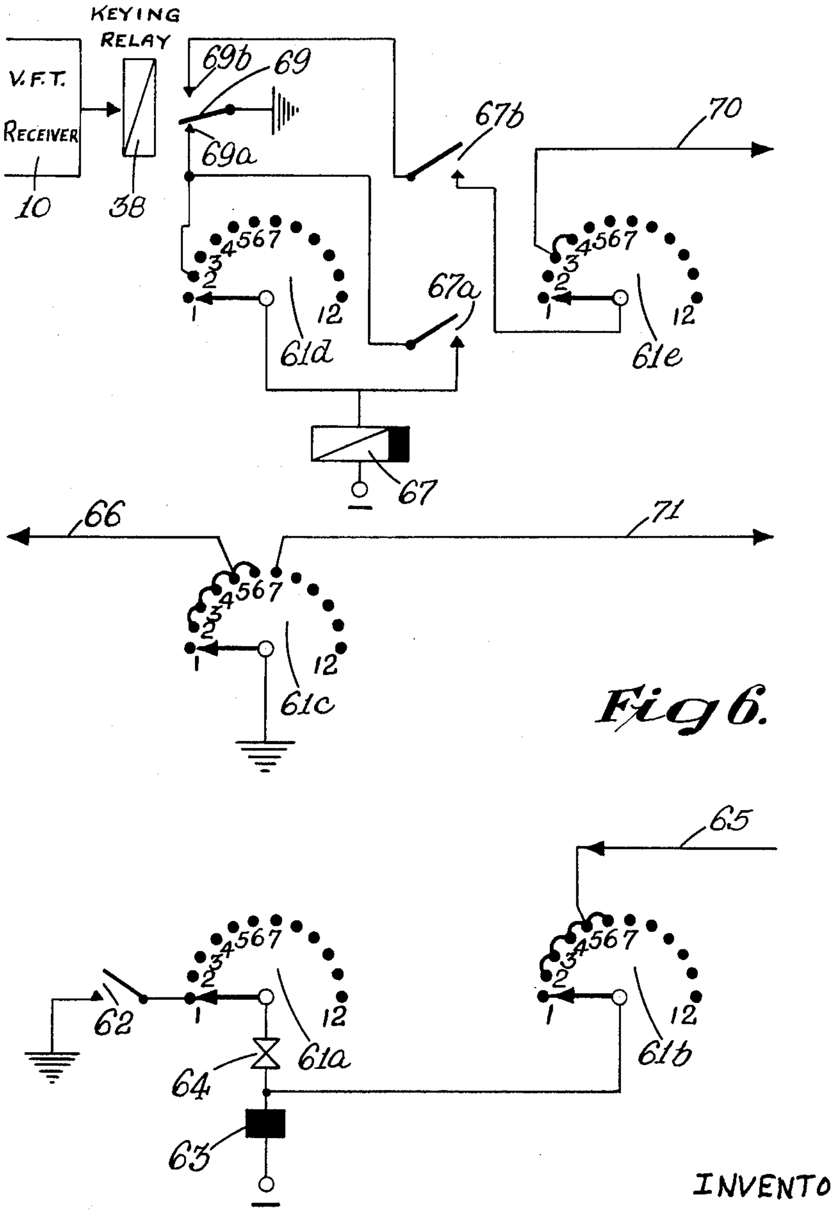
FIGURE 6 is a diagrammatic representation of the control unit of FIGURE 4.

Referring now to FIGURE 6, control means 60 (FIGURE 4) includes a uniselector comprising five sections, **61*a*, 61*b*, 61*c*, 61*d* and 61*e*. When the circuit connection between lines 58 and 59 of FIGURE 5 is completed, a relay coil (not shown) closes contacts 62 to prime the uniselector 61*a*–61*d* by connecting its operating coil 63 to earth through its breaker contacts 64. All the uniselector sections are stepped from home position 1 to position 2**.

When uniselector section **61*b* is stepped to position 2, stepping impulses having a frequency of one pulse per second are fed from line 65 through uniselector section 61*b* to cause all the uniselector sections to be stepped five positions at one second intervals from positions 2 to positions 7**.

During the stepping sequence, the 800 cycles per second acknowledging signal generator 13 (FIGURE 4) is energised for five seconds through uniselector section **61*c* and line 66 (FIGURE 6). An acknowledging signal is transmitted to local station 2 to release locking relay 3 (FIGURE 2). If received at local station 2, the acknowledging signal causes all the circuits of local station to return to a quiescent state and to terminate the 1.5 kc. tone transmitted by local station 2** at a point such as I in FIGURE 3.

Whilst a 1.5 kc. tone is being received from local station 2 during the period immediately following termination of the 1.5 kc. V.F.T. code during a signalling cycle (i.e. the period following point E in FIGURE 3) the make contact 69 of keying relay 38 is connected with contact **69*a* as shown in FIGURE 6. When uniselector section 61*d* is in position 2, slow release relay coil 67 is energised to close its two contact sets 67*a*, 67*b*. Upon closure of contact set 67*a*, coil 67 is locked to earth through contact 69**.

Upon termination in response to an acknowledging signal, of the 1.5 kc. tone at point I in FIGURE 3, keying relay 38 releases and contact 69 makes connection with contact **69*b* so that a circuit is completed between earth and uniselector section 61*e* through slow release contacts 67*b* for the duration of the slow release. If this circuit is closed at any time during the two second period uniselector section 61*e* is in positions 3 and 4, a connection will be established from earth through line 70 to printing recorder 15 to cause printing of a character such as an asterisk on tape 39 after the received code to indicate that the acknowledging signal has been safely received by local station 2**.

It will be appreciated that if no 1.5 kc. tone is received from local station 2 during the first second of the five second transmission period of the 800 cycles per second acknowledging signal from remote station 9, the asterisk will not be printed since the necessary circuits will not be established by relay contact 69 as required. The asterisk will accordingly not be printed unless local station 2 functions normally immediately after termination of the V.F.T. code (i.e. the period after point E in FIGURE 3).

Furthermore, if the 1.5 kc. signal does not cease during the second and third seconds of the period of acknowledging signal transmission, the asterisk will also not be printed. Uniselector section **61*e*** therefore provides a two second gate period during which printing of the asterisk is possible.

Absence of printing of the asterisk gives a warning that the signalling circuits between the local and remote stations might be faulty and requires checking.

Upon completion of the five second transmission of the acknowledging signal and when uniselector section **61*c*, (FIGURE 6) is in position 7, uniselector section 61*c* closes a circuit through line 71 automatically to release or reset all the apparatus of remote station 9 to permit such apparatus to return to a normal quiescent condition. Preferably, completion of the circuit through line 71 causes the time of the alarm signalling to be printed on tape 15 as shown in FIGURE 4, before the apparatus is released or reset. The time signal may be derived from a digital clock and presented to printing recorder 15** by suitable automatic switching arrangements in impulse code form.

As shown in FIGURE 4, time delay relay means 72 is provided and arranged automatically to release the apparatus in the event of an incomplete or incoherent code being received, or in the event of the receiving equipment being primed by some spurious line ringing current. A time delay in the order of 50 seconds is provided which is somewhat longer than the time required for complete reception of a genuine code.

Full circuit diagrams of the apparatus are not shown since in practice the circuitry is understandably complex and considerable design flexibility is possible within the scope of the appended claims. However, the invention and the manner in which it is to be performed will be quite clear to a person skilled in the art in the light of the above description.

Amplifiers 23, 24 and 28 of local station 2 may be of conventional design, amplifier 24 including a suitable filtering arrangement to make it frequency selective. V.F.T. receiver 10 of remote station 9 and acknowledging signal receiver 14 of local station 2 may also be of conventional design. As stated above, acknowledging signal receiver 14 may include a reed relay to make it highly selective.

Acknowledging signal generator 13 of remote station 9 may be an oscillator of conventional design.

Locking relays 3, delay relay 4, release relay 31 and dialling relay 25 of local station 2, keying relay 38 of remote station 9, and any other relays may be of any suitable arrangement. Several alternative arrangements will readily suggest themselves to a skilled person. Delay relay 4 may, for example, include a temperature-sensitive bi-metal strip through which an electric current is passed upon detection of an alarm condition. The bi-metal strip is arranged to cause actuation, such as by closure of a switch, of local alarm 5 after the required interval of time as a result of distortion of the strip due to thermal effects. Upon release of locking relays 3 before alarm 5 is actuated, the current flow through the bi-metal strip is terminated to prevent closure of the actuating switch, thereby to prevent actuation of alarm 5. After alarm 5 has been actuated, termination of the current flow through the bi-metal strip upon release of locking relays 3, will act to open the actuating switch, thereby to terminate further operation of alarm 5.

It will be appreciated that many alternative arrangements and/or additional facilities may be provided without departing from the invention as defined by the claims. For example, the local alarm 5 is preferably housed in a steel enclosure and a tamper switch provided on the enclosure. The tamper switch is associated with relay switching means so that alarm 5 is operated immediately in the event of unauthorised tampering wtih the alarm enclosure. The silent signalling circuits may also be primed.

Optional relay means may be provided at the local station immediately to sound the local alarm in the event of the telephone line being out of order without waiting for the expiry of the 100 second delay period. Such relay means may be arranged to be responsive to the normal telephone line D.C. current or to the normal "dialling tone."

So also may optional means be provided at the local station to transmit coded information in addition to the identification code. Such additional information would be termed a "qualifying" code and may be arranged to achieve any useful purpose.. Alternatively, it may be arranged to distinguish between burglary and fire or any other alarm condition or it may be arranged to transmit subdivided alarm information. It will be understood that the code generating means for such purposes would of necessity be more complex than described for the basic arrangement, and may include a plurality of programme tapes or a multi-track tape with a plurality of reproducing heads, or means for preselecting the position of a single reproducing head relative to a multi-track tape, or means for stepping out the desired qualifying code as with uniselector switches and the like, or means for pre-selecting the desired code or qualifying code according to the specific alarm condition that demands transmission.

An alarm received at remote station 9 may be relayed manually or automatically to one or more police or fire stations. The proprietor of the premises concerned may also be alerted.

It will be appreciated that the invention essentially provides a system capable of making intelligent decisions in accordance with prevailing circumstances. The system is primarily intended to transmit a silent alarm signal from the local station to the remote station. In the event of the local station not being able to establish communication with the remote station, the local alarm is caused to operate after a predetermined period. Even where the remote station receives an alarm signal but the local station does not receive an acknowledging signal, the system errs on the safe side by causing operation of the local alarm after the predetermined period. It will be clear from the foregoing that the system is capable of making further decisions.

I claim:

1. A signalling apparatus for protecting a plurality of individual spaced zones each having means for detecting an alarm condition; comprising means for automatically setting a local alarm located at the alarm condition zone to operate automatically after a preselected delay interval; means for automatically establishing a communication link between each said individual alarm condition zone and a remote station common to all the zones; automatically transmitting an alarm signal in the form of an identification code distinctive of the alarm condition zone from each said zone to the remote station through said established communication link; means for automatically analysing said coded alarm signals received at the remote station; means for automatically transmitting an acknowledgement signal from the remote station to the alarm condition zone concerned through the communication link upon error free receipt at the remote station of the accredited identification code of that zone; and means for automatically immobilizing the local alarm upon receipt at the alarm condition zone of said acknowledgement signal from the remote station.

2. A signalling apparatus as claimed in claim 1 in which each said alarm signal is in the form of an identification code comprising a repeated combination of a definite number of digits, a control character preceding the first combintion of digits, interposed between the repeated combinations and following the second combination of digits; and said means for analyzing said coded alarm signal includes means for counting the total number of digits and characters, the number of control characters, the number of digits, and means for determining their proper sequential relation.

3. An alarm system including alarm condition detector means at a protected zone; a remote station, an automatic telephone system including a normally unconnected communicating link between said protected zone and the remote station, delayed action local alarm means located at the protected zone and settable automatically upon detection of an alarm condition to operate after a predetermined interval of time; signalling means at the local station responsive to the detection of an alarm condition, said signalling means being operable to establish automatically said communication link and to send automatically to the remote station through the communication link an identification signal code distinctive of the protected zone; signal receiving means at the remote station; signal analysing means at the remote station; acknowledgement signal transmitting means located at the remote station and capable of sending automatically an acknowledging signal back to the protected zone through said communication link upon error-free receipt at the remote station of the accredited identification signal code of the protected zone; and control means at the protected zone for immobilizing automatically the local alarm means upon receipt of an acknowledging signal from the remote station in response to an identification signal from the protected zone.

4. An alarm system as claimed in claim 3, including regulator means at the protected zone adapted to prevent immobilisation of the local alarm unless the acknowledging signal is maintained for a predetermined period of time.

5. An alarm system as claimed in claim 3, including recorder means at said remote station adapted to produce a graphic representation of a signal received at the remote station.

6. An alarm system as claimed in claim 5, including control means at the remote station adapted to cause the recorder to produce a graphical indication after the graphical representation of a received signal of the safe receipt at the protected zone of the acknowledgement signal.

References Cited by the Examiner

UNITED STATES PATENTS

| | | | |
|---|---|---|---|
| 1,919,007 | 7/1933 | Chase | 340—298 |
| 2,978,676 | 4/1961 | Spencer | 340—226 |
| 3,021,398 | 2/1962 | Barnett et al. | 340—226 |
| 3,069,673 | 12/1962 | Ward et al. | 340—313 |
| 3,131,376 | 4/1964 | Du Vall | 340—226 X |
| 3,171,108 | 2/1965 | MacKean | 340—226 |

NEIL C. READ, *Primary Examiner.*